(12) United States Patent
Amemiya et al.

(10) Patent No.: US 11,078,350 B2
(45) Date of Patent: Aug. 3, 2021

(54) CLEANING MEMBER, PRODUCTION METHOD OF SAME, AND IMAGE FORMING APPARATUS

(71) Applicant: Konica Minolta, Inc., Tokyo (JP)

(72) Inventors: Taiki Amemiya, Hachioji (JP); Yukio Hosoya, Tami (JP); Kunihiro Ogura, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 198 days.

(21) Appl. No.: 16/517,893

(22) Filed: Jul. 22, 2019

(65) Prior Publication Data

US 2020/0079937 A1    Mar. 12, 2020

(30) Foreign Application Priority Data

Sep. 11, 2018  (JP) .............................. JP2018-169317

(51) Int. Cl.
*C08L 15/02* (2006.01)
*G03G 21/00* (2006.01)
*B41J 2/165* (2006.01)

(52) U.S. Cl.
CPC .......... *C08L 15/02* (2013.01); *B41J 2/16517* (2013.01); *G03G 21/0017* (2013.01)

(58) Field of Classification Search
CPC ... C08L 15/02; B41J 2/16517; G03G 21/0017
See application file for complete search history.

(56) References Cited

U.S. PATENT DOCUMENTS

| | | | | |
|---|---|---|---|---|
| 5,949,447 A | * | 9/1999 | Arai | B41J 2/16517 347/23 |
| 2011/0135360 A1 | * | 6/2011 | Koido | G03G 21/0017 399/344 |
| 2014/0119799 A1 | * | 5/2014 | Kabata | G03G 21/0017 399/350 |

FOREIGN PATENT DOCUMENTS

JP            2018013767 A        1/2018

* cited by examiner

*Primary Examiner* — Sandra Brase
(74) *Attorney, Agent, or Firm* — Lucas & Mercanti, LLP

(57) ABSTRACT

Provided is a cleaning member including a urethane rubber, wherein the urethane rubber has a cyclic structure portion in which a fluorine atom is directly bonded to the cyclic structure portion.

9 Claims, 2 Drawing Sheets

CLEANING MEMBER, PRODUCTION METHOD OF SAME, AND IMAGE FORMING APPARATUS

Japanese Patent Application No. 2018-169317, filed on Sep. 11, 2018 with Japan Patent Office, is incorporated herein by reference in its entirety.

BACKGROUND

1. Technological Field

The present invention relates to a cleaning member, a method of producing the same, and an image forming apparatus equipped with the same. More particularly, the present invention relates to a cleaning member with reduced wear.

2. Description of the Related Art

A urethane rubber is known as a rubber material excellent in abrasion resistance, and is used in applications as a cleaning member that is used by friction and sliding for cleaning the surface of a mating material, removing foreign substances. For example, in an electrophotographic printing method, in a cleaning step of removing the transfer residual toner, a method of scraping a toner by bringing an edge of a plate-like urethane rubber member into contact with a target member is widely adopted.

In the electrophotographic printer, needs for higher durability of the unit are increasing year by year, and further reduction in wear is required for the cleaning member. The reason of this is that, as the wear progresses, the cleaning function of the member is lowered, and the reliability of the cleaning is lowered.

In general, it is considered to be advantageous for abrasion to increase the strength (hardness and elasticity) by increasing the crosslink density of the rubber member. However, in the application as a cleaning member, even if the crosslink density is increased, the effect of reducing the wear cannot always be obtained, and there is a case in which the wear may be worsen.

In addition, in order to reduce wear, a method is known to introduce a structure containing a fluorine atom to reduce friction. For example, a method of using fluororubber as a rubber main material, and a method of coating the cleaning member surface with a fluororesin are mentioned. However, in these methods, the strength properties may be inferior to a urethane rubber, and the wear resistance may be deteriorated.

As a method of introduce a fluorine atom, without largely changing the physical property of a urethane rubber, a method of using a material containing a fluorine atom as a part of monomer used as a raw material of a urethane rubber is mentioned. Patent Document 1 (Japanese Patent Application (JP-A) No. 2018-13767) proposes a urethane member using a fluoroethylene, a (meth)acrylate having a fluoroalkyl group, and a fluoroalkylvinyl compound as a monomer of the polyol component. However, in this method, although the wear is improved as compared to the urethane rubber not containing a fluorine atom, the improvement effect is insufficient.

SUMMARY

The present invention has been made in view of the above problems and circumstances. An object of the present invention is to provide a cleaning member with reduced wear. Another object of the present invention is to provide a method of producing the same and an image forming apparatus having the same.

A cleaning member reflecting an aspect of the present invention for achieving the above-described object is a cleaning member containing a urethane rubber, wherein the urethane rubber has a cyclic structure portion in which a fluorine atom is directly bonded to the cyclic structure portion.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Figure 1:
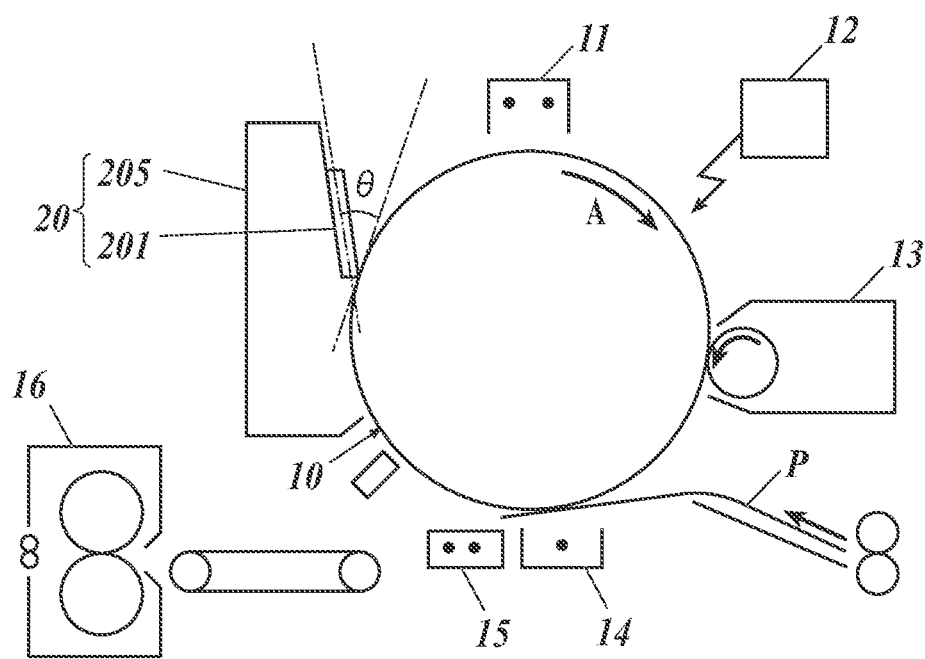
FIG. 1 is a drawing schematically illustrating an example of a configuration of an image forming apparatus of the present invention.

Hereinafter, one or more embodiments of the present invention will be described with reference to the drawings. However, the scope of the invention is not limited to the disclosed embodiments.

The cleaning member of the present invention is a cleaning member containing a urethane rubber, and the urethane rubber has a cyclic structure portion to which a fluorine atom is directly connected. This feature is a technical feature common to or corresponding to the following embodiments (forms).

By the above embodiments of the present invention, it is possible to provide a cleaning member with reduced wear. Further, the production method and the image forming apparatus having the same may be provided. The mechanism for expressing the effect of the present invention or the mechanism of action is not clear, but it is presumed as follows.

In applications as a cleaning member, stick-slip motion of the member is characteristic. When the member is drawn in the driving direction of the mating member by the frictional force and the amount of drawing is increased and the restoring force of the rubber exceeds the frictional force, it returns to the upstream position in the driving direction. There is a feature that this reciprocating motion is repeated.

In the present invention, the mechanism of the progress of wear was inferred as follows. During the stick-slip motion, stress is concentrated at the cross-linking point due to spreading tension or bending by retraction at the contact portion, and molecular chain breakage occurs. Wear progresses because the crack grows from the break point. In particular, in the cleaning blade for electrophotography, the stick-slip motion is a motion in a very small area of several tens of μm in terms of motion width. With respect to repeated fatigue under such a relatively small external force, it is believed that the higher the crosslink density, the more likely cracking will occur, and it is estimated that the wear is more likely to deteriorate.

In the configuration of the present invention, since the urethane rubber contains a structure having a fluorine atom in the molecule, it is considered that the restraint by the intermolecular force is weakened and the mobility of the molecular chain is improved. As a result, since the stress concentration to the crosslinking point is suppressed, it is presumed that even if the structure has a high crosslinking density, it is difficult to cause molecular chain scission which is the starting point of the crack, and the wear is reduced.

Further, as compared with the configuration described in Patent Document 1, the present invention is different in that the fluorine atom is substituted or added not only to the side chain of the alkyl chain but also to the cyclic structure portion derived from a benzene ring. For intermolecular forces, for example, a π-π interaction between benzene rings has a greater contribution than the interaction between alkyl chains. It is considered that the symmetry of the electron orbital of the cyclic structure portion is reduced and stacking becomes difficult by the fact that the strongly electron-withdrawing fluorine atom is directly bonded to the site derived from the benzene ring. Therefore, it is presumed that the mobility of the molecular chain may be greatly enhanced and abrasion may be further reduced, as compared with the case where only the side chain of the alkyl chain is substituted with a fluorine atom.

As an embodiment of the present invention, it is preferable that the fluorine atom is present at least on the surface of the cleaning member, from the viewpoint of the effects of the present invention. Moreover, it is preferable that the above-described fluorine atom exists in a region within 20 μm in depth from the above-described surface from the viewpoint of further increasing the effect of the present invention. Further, it is preferable that it is a cleaning member for an ink-jet printing or an electrophotographic printing.

In the present invention, a cleaning blade is preferred. As a production method of the cleaning member of the present invention, it is preferable that it is a production method including the process of fluorinating the urethane rubber by reacting the urethane rubber with a fluorine gas or a fluorine compound gas.

Further, it is preferable to make the urethane rubber and fluorine gas react in the fluorinating process. Moreover, it is preferable to include the process of molding a urethane rubber. It is preferable that the image forming apparatus has the cleaning member of the present invention.

The present invention and the constitution elements thereof, as well as configurations and embodiments, will be detailed in the following. In the present description, when two figures are used to indicate a range of value before and after "to", these figures are included in the range as a lowest limit value and an upper limit value.

<<Outline of Cleaning Member>>

The cleaning member of the present invention is a cleaning member containing a urethane rubber, and the urethane rubber has a cyclic structure portion to which a fluorine atom is directly connected. The cleaning member of the present invention may be preferably used in an electrophotographic image forming apparatus as a cleaning blade and as a plate-like member having elasticity and an edge portion.

In blade cleaning, the plate-like member preferably has flexibility to follow and adhere closely to the irregularities of the surface of the image carrier at the cleaning nip portion, and also has appropriate strength in order to reduce abrasion due to abrasion. A urethane rubber is used from the viewpoint of the dimensional accuracy of the edge portion. In the present invention, the abrasion resistance is improved by the urethane rubber having a cyclic structure portion to which a fluorine atom is directly bonded. As a further preferable embodiment, it is possible to obtain a cleaning member which has an appropriate strength and reduced wear by providing a fluorine atom on the surface of the cleaning member which is easy to wear.

[Urethane Rubber]

(Cyclic Structure Portion)

The urethane rubber according to the present invention has a cyclic structure portion in which a fluorine atom is directly bonded to the cyclic structure portion. The cyclic structure portion means a hydrocarbon ring or a heterocyclic ring. As a preferable cyclic structure portion in which a fluorine atom is connected directly, the following structures are mentioned, for example.

(1) A compound in which a part of hydrogen atoms in a benzene ring skeleton is substituted by a fluorine atom by a substitution reaction in a benzene ring.

(2) A compound having a fluorine atom in the side chain of a cyclohexane, cyclohexene or cyclohexadiene skeleton by addition reaction of a fluorine atom to a benzene ring.

It is preferable to contain at least the above (2) from the viewpoint of reducing the symmetry of the electron orbital of the ring structure portion of the benzene ring and reducing π-π stacking. This is because π electrons themselves decrease. Further, in any of the structures (1) and (2), it is preferable that the number of fluorine atoms directly connected to one cyclic structure portion be larger.

The presence of a fluorine atom directly bonded to the cyclic structure portion may be detected from the peak position by fluorine 19 nuclear magnetic resonance ($^{19}$F NMR). Specifically, a fluorine atom present at a position at which a hydrogen atom of a cyclic structure portion such as benzene ring or cyclohexane is substituted is distinguished because a peak is detected at a position different from a fluorine atom of an alkyl chain.

The fluorine atom is preferably present at least on the surface of the cleaning member, and the fluorine atom is preferably present in a region within a depth of 20 μm from the surface. When using a cleaning member as a cleaning blade, as a whole, high rigidity is preferable. When the cleaning blade is drawn in by the frictional force with the photoreceptor, stress concentration on the tip of the cleaning blade may be reduced if the restoring force of the cleaning blade is large and the amount of drawing is small.

When the benzene ring is not substituted with a fluorine atom, the rigidity of the cleaning blade is high and the resilience is large. Therefore, it is preferable that the fluorine atom is not substituted except in the vicinity of the tip of the plate-like member where the stress is concentrated. When fluorine atoms are present in a region within a depth of 20 μm from the surface, the rigidity of the blade as a whole is not reduced, and the effect of reducing wear is further enhanced More preferably, fluorine atoms are present in a region within a depth of 20 μm from the surface. Still more preferably, fluorine atoms are present only in a region within 20 μm in depth from the surface. The region in which the fluorine atoms are present may be controlled, for example, by changing the gas concentration, the reaction temperature, and the reaction time in the step of fluorinating a urethane rubber described later.

(Area Where Fluorine Atom Exists)

The area where the fluorine atom is present is measured as follows. Each sample is embedded in a resin, and a cross-sectional line analysis is performed with the cross-section exposed by using the above-mentioned EPMA (electron beam micro analyzer) as described in JP-A No. 2005-54067. The width of the peak of the detected intensity peak value is taken as the layer thickness in which a fluorine atom exists. The width of the peak of the intensity peak value detected by EPMA may be measured using JXA-8900 manufactured by JEOL Ltd. with the threshold value of fluorine intensity as 50. A fluorine atom is defined as "absent" if no peak is observed in the measurement by the above-mentioned EPMA, even if it is present in a trace amount.

<<Method of Producing Cleaning Member>>

The producing method of the cleaning member of the present invention includes the step of fluorinating the urethane rubber by reacting the urethane rubber with a fluorine gas or a fluorine compound gas. More preferably, a urethane rubber is reacted with a fluorine gas. Further, it is preferable to include the process of molding a urethane rubber. It is preferable to mold and to make it as a plate-shaped member. The urethane rubber, which is a raw material before fluorination and used in the process to fluorinate, may be produced by a well-known method. As the polymerization method, a general method of polyurethane such as prepolymer method or one shot method is used. The prepolymer method is suitable for the present embodiment because a polyurethane excellent in strength and abrasion resistance is obtained, but the present invention is not limited by the production method.

An example of the production method in the prepolymer method is as follows. A raw material urethane rubber is prepared by using polyurethane and polyisocyanate to prepare polyurethane prepolymer. A crosslinking agent, a chain extender, and, optionally, a curing catalyst are added to the polyurethane prepolymer to crosslink the polyurethane prepolymer in a predetermined mold. The product is post-crosslinked in a furnace and formed into a sheet by centrifugal molding, and the obtained sheet is left to stand at normal temperature for aging, and cut into a flat sheet with a predetermined size. Thus it is produced as a plate-like member. The above-mentioned polyols may be used alone or in combination, and may be appropriately selected depending on the purpose. Examples thereof include high molecular weight polyol and a low molecular weight polyols.

Examples of the high molecular weight polyol include: polyester polyols which are condensation products of alkylene glycols and aliphatic dibasic acids such as adipic acid; polycaprolactone-based polyols such as polycaprolactone ester polyols obtained by ring-opening polymerization of caprolactone; and polyether-based polyols such as poly(oxytetramethylene) glycol and poly(oxypropylene)glycol. Examples of the above-described alkylene glycol include: ethylene adipate ester polyol, butylene adipate ester polyol, hexylene adipate ester polyol, ethylene propylene adipate ester polyol, ethylene butylene adipate ester polyol, and ethylene neopentylene adipate ester polyol.

Examples of the low molecular weight polyol include: dihydric alcohols such as 1,4-butanediol, ethylene glycol, neopentyl glycol, hydroquinone-bis(2-hydroxyethyl) ether, 3,3'-dichloro-4,4'-diaminodiphenylmethane, and 4,4'-diaminodiphenylmethane; trivalent or higher polyhydric alcohols such as 1,1-trimethylolpropane, glycerin, 1,2,6-hexanetriol, 1,2,4-butanetriol, trimethylolethane, 1,1,1-tris(hydroxyethoxymethyl)propane, diglycerin, and pentaerythritol. Among the high molecular weight polyols, for example, a polyol obtained by dehydration condensation of a diol and a dicarboxylic acid is suitably used as the polyester polyol. Examples of the diol are: ethylene glycol, 1,3-propanediol, 1,4-butanediol, 1,5-pentanediol, 1,6-hexanediol, 1,7-heptanediol, 1,8-octanediol, 1,9-nonan Diol, 1,10-decanediol, 1,11-undecanediol, 1,12-dodecanediol, 1,13-tridecanediol, and 1,14-tetradecanediol.

These may be used alone or in combination of two or more.

Examples of the dicarboxylic acid include: oxalic acid, malonic acid, succinic acid, methylmalonic acid, glutaric acid, ethylmalonic acid, methylsuccinic acid, adipic acid, propylmalonic acid, ethylsuccinic acid, dimethylsuccinic acid, pimelic acid, butylmalonic acid, diethylmalonic acid, propylsuccinic acid Acid, suberic acid, azelaic acid, sebacic acid, undecanedioic acid, dodecanedioic acid, phthalic acid, and decamethylenedicarboxylic acid. Among these, succinic acid, adipic acid, sebacic acid, decamethylene dicarboxylic acid and phthalic acid are preferable. These may be used alone or in combination of two or more.

The above polyisocyanate may be one kind or more and may be appropriately selected according to the purpose. Examples of the polyisocyanate include: methylene diphenyl diisocyanate (MDI), tolylene diisocyanate (TDI), xylylene diisocyanate (XDI), naphthylene-1,5-diisocyanate (NDI), tetramethylxylene diisocyanate (TMXDI), isophorone diisocyanate (IPDI), hydrogenated xylylene Isocyanate (H6XDI), dicyclohexylmethane diisocyanate (H12MDI), hexamethylene diisocyanate (HDI), dimer acid diisocyanate (DDI), norbornene diisocyanate (NBDI) and trimethylhexamethylene diisocyanate (TMDI).

Further, when preparing a polyurethane prepolymer using a polyol and a polyisocyanate, a polymer polyol containing a fluorine atom may be used as the polyol to be reacted with the polyisocyanate. Specific examples of the polymer polyol containing a fluorine atom are polymers of fluoroethylene, (meth)acrylate having a fluoroalkyl group or a fluoroalkyl-vinyl compound, and a monomer having a hydroxy group.

Specific examples of the fluoroethylene are: 1-fluoroethylene, 1,1-difluoroethylene, 1,1,2-trifluoroethylene, 1,1,2,2-tetrafluoroethylene, chlorotrifluoroethylene, tetrafluoroethylene and α,β,β-trifluorostyrene.

Specific examples of the fluoroalkyl (meth)acrylate are: 2,2,2-trifluoroethyl (meth)acrylate, 2,2,3,3,3-pentafluoroethyl (meth)acrylate, 2-(perfluoroethyl)ethyl (meth)acrylate, 2-(perfluoro)butyl)ethyl (meth)acrylate, 2-(perfluorohexyl)ethyl (meth)acrylate, 1H,1H,3H-tetrafluoropropyl (meth) acrylate, 1H,1H,3H-hexafluorobutyl (meth)acrylate, 1H,1H,5H-octafluoropentyl (meth)acrylate, 1H,1H,7H-dodecafluoro (meth)acrylate, 1H-1-(trifluoromethyl) trifluoroethyl (meth)acrylate, and 1,2,2,2-tetrafluoro-1-(trifluoromethyl)ethyl (meth)acrylate.

Specific examples of the fluoroalkylvinyl compound are: trifluoromethylethylene, perfluoroethylethylene, 4,4,4-trifluoro-1-butene, perfluorobutylethylene, perfluorohexylethylene, 3-(perfluorobutyl)-1-propene, and 3-(perfluoro)hexyl)-1-propene.

Specific examples of the monomer having a hydroxy group are: hydroxy group containing (meth)acrylates such as hydroxymethyl (meth)acrylate, 2-hydroxyethyl (meth)acrylate, 2-hydroxypropyl acrylate, 3-hydroxypropyl (meth) acrylate, 4-hydroxybutyl (meth)acrylate, 3-hydroxybutyl (meth)acrylate, 6-hydroxyhexyl (meth)acrylate, 8-hydroxyoctyl (meth)acrylate, ethyl 2-(hydroxymethyl) (meth) acrylate, 2-hydroxy-3-phenoxypropyl (meth)acrylate, and 1,4-cyclohexanedimethanol mono(meth)acrylate; hydroxy group containing vinyl ether such as 2-hydroxyethylvinylether, 3-hydroxypropylvinylether, 4-hydroxybutylvinylether, 6-hydroxyhexylvinylether, diethylene glycol monovinylether, and 2-ethyl-1-vinyloxyhexane. These polymerizable compounds having a hydroxy group may be used singly or in combination of two or more.

The polymer polyol containing a fluorine atom may be used to polymerize a radically polymerizable monomer in combination with the above-described monomer. Specific examples of the radically polymerizable monomer are: (meth)acrylates such as methyl (meth)acrylate, ethyl (meth)acrylate, t-butyl (meth)acrylate, isobutyl (meth)acrylate, n-butyl (meth)acrylate, n-hexyl (meth)acrylate, n-octyl (meth)acrylate, n-lauryl (meth)acrylate, 2-ethylhexyl (meth)acrylate, and cyclohexyl (meth)acrylate; vinyl ethers such as methyl vinyl ether, ethyl vinyl ether, t-butyl vinyl ether, isobutyl vinyl ether, n-butyl vinyl ether, n-hexyl vinyl ether, n-octyl vinyl ether, n-lauryl vinyl ether, 2-ethylhexyl vinyl ether, and cyclohexyl vinyl ether.

It is also possible to use a commercially available polyol as a polyol containing a fluorine atom. Specific examples of such polyols are given below: Cefral coat PX-40, Cefral coat A 202 B, Cefral coat A 606 X, Cefral coat CF 803 (trade names, manufactured by Central Glass Co., Ltd.); Lumiflon LF-100, Lumiflon LF-200, Lumiflon LF-302, Lumiflon LF-400, Lumiflon LF-554, Lumiflon LF-600, Lumiflon LF-986N (trade names, manufactured by Asahi Glass Co., Ltd.); Zaflon FC-110, Zaflon FC-220, Zaflon FC-250, Zaflon FC-275, Zaflon FC-310, Zaflon FC-575, Zaflon XFC-973 (all of trade names, manufactured by Toagosei Co., Ltd.); Zeffle GK-510 (trade name, manufactured by Daikin Industries, Ltd.); and Fluonate series (trade name, manufactured by Dainippon Ink & Chemicals, Inc.).

As a crosslinking agent, diol (bifunctional), triol (trifunctional), and tetraol (tetrafunctional) are mentioned. They may be used in combination. Moreover, an amine compound may be used as a crosslinking agent. In addition, it is desirable that it is crosslinked using the trifunctional or more functional crosslinking agent. The trifunctional crosslinking agent is not particularly limited, and examples thereof include trimethylolpropane, glycerin, and triisopropanolamine. Further, as the chain extender, a diol or diamine having a weight average molecular weight (Mw) of less than 400 may be used, and examples thereof include 1,4-butanediol.

The curing catalyst may be one kind or more and can be appropriately selected according to the purpose. Examples thereof include 2-methylimidazole and 1,2-dimethylimidazole. The content of the curing catalyst may be appropriately selected according to the purpose. It is preferable that it is in the range of 0.01 to 0.5 mass %, and it is more preferable that it is in the range of 0.05 to 0.3 mass %.

[Step of Fluorinating Urethane Rubber]

In the step of fluorinating the urethane rubber, the urethane rubber is fluorinated by reacting the urethane rubber manufactured as described above with a fluorine gas or a fluorine compound gas. By using a fluorine gas or a fluorine compound gas, a fluorine atom may be introduced to the surface of the urethane rubber.

Specifically, it may be fluorinated by direct fluorination method or plasma fluorination method. By using these methods, a fluorine atom may be introduced also to the aromatic ring. Further, by adjusting the fluorination conditions, it is possible to control the degree of fluorination of the urethane rubber and the content of fluorine atoms in the depth direction from the surface of the urethane rubber.

(1) Direct Fluorination Method

It is a method of contacting fluorine gas directly. The fluorine gas dissociates easily, and the generated fluorine radicals react with the urethane rubber. If necessary, an inert gas may be used together with the fluorine gas. For example, a urethane rubber is placed in a processing container and the processing container is depressurized to 100 Pa or less. Then, the atmosphere is replaced with an inert gas such as a nitrogen gas. Thereafter, a fluorine gas is introduced into the container so as to be 0.1 to 99%. At this time, the pressure of the fluorine gas is preferably in the range of 1 to 1000 kPa. The treatment time for contacting with fluorine gas is in the range of 10 seconds to 10 days, preferably in the range of 10 minutes to 10 hours. The treatment temperature is in the range of 0 to 200° C., preferably from room temperature to 100° C.

(2) Plasma Fluorination Method

This method is described in JP-A 6-9803, for example. Plasma generated by applying a DC voltage of 0.5 to 2.5 kV in the presence of a fluorine-containing gas of 13 to 130 Pa in a vacuum atmosphere is irradiated to a surface of a urethane rubber. Thus, the urethane rubber may be fluorinated. A relatively weak energy direct current electric field generated between the cathode and the anode causes the fluorine-containing gas to be plasmatized, which is chemically adsorbed on the surface of the urethane rubber placed on the cathode, and the surface is fluorinated.

As the fluorine-containing gas, a fluorine compound such as $CF_4$, $NF_3$, $SF_6$, $C_2F_4$, or $C_2F_6$ may be used to plasmatize these gases to fluorinate the surface of the urethane rubber.

[Step of Molding Urethane Rubber]

The urethane rubber may be molded into a plate-like urethane rubber member as a cleaning member. Molding may be carried out by known methods. The molding may be performed before or after the step of fluorinating the urethane rubber.

<<Applications>>

The cleaning member of the present invention may be used for electrophotographic applications and inkjet printer. For electrophotographic applications, it may be used as a cleaning blade for a photoreceptor or a cleaning blade for an intermediate transfer belt. The cleaning blade for electrophotography is preferably in the form of a plate, and it preferably has a hardness of 60 to 80 degree defined in JIS-A, more preferably 65 to 75 degrees. When the hardness is 60 degrees or more, the cleaning blade has appropriate rigidity, expansion due to retraction at the contact portion may be suppressed, and cracks may be suppressed, so that the effect of reducing wear may be sufficiently obtained. When the hardness is 80 degrees or less, the crosslink density may be designed to be relatively low as compared to the case where the hardness is greater than 80 degrees, and molecular chain breakage due to stress concentration on the crosslink points may be suppressed. As a result, the effect of reducing wear may be obtained sufficiently.

Further, the resilience of the above plate-like member is preferably 10 to 80%, more preferably 10 to 50%, as the resilience coefficient measured at 25° C. When the impact resilience is 10% or more, the cleaning blade has an adequate restoring force, and expansion due to retraction at the contact portion may be suppressed, and cracks may be suppressed, so that the effect of reducing wear may be sufficiently obtained. When the impact resilience is 80% or less, the crosslink density may be designed to be relatively low compared to the case where the impact resilience is greater than 80%, and molecular chain breakage due to stress concentration on the crosslink point is suppressed. As a result, the effect of reducing wear may be obtained sufficiently. The hardness and the impact resilience may be adjusted by the type of the material of the plate-like member and the addition ratio thereof.

For ink-jet printer applications, the present invention may be applied to a transfer belt, a cleaning blade for a transport belt, and a cleaning blade for a print head. In addition, the present invention may be used also as a wiper for vehicles and a squeegee, as a general use.

<<Image Forming Apparatus>>

It is possible to use the cleaning blade according to the present invention as a member for removing a deposit from the surface of the image carrier by contacting the surface of the image carrier with a urethane rubber having a fluorine atom in a cyclic structure portion at least at its edge portion. That is, the above-described cleaning blade may be used as a cleaning blade in a blade cleaning method in electrophotographic image formation. The image formation by the electrophotographic method may be performed using and image forming apparatus of a known electrophotographic method equipped with: an image carrier for carrying and transferring a toner image; and a cleaning blade for removing the toner particles remaining on the surface of the image carrier by coming into contact with the surface of the image carrier after transferring the toner image. The edge portion may have a length sufficient to abut the entire length of the surface in the axial direction of the image carrier, and, for example, it may be an angle (one side edge) in the shape of a cross section that transverses the longitudinal direction of the plate-like member.

The cleaning blade is brought into contact with the image carrier at the edge portion so that the first portion is positioned upstream of the moving direction of the surface of the image carrier, thereby it is used as a cleaning blade in a known electrophotographic image forming apparatus. In addition, an electrophotographic image forming method using the cleaning blade may be performed by using the cleaning blade according to the present embodiment in the above-mentioned known electrophotographic image forming apparatus.

In the image forming method, known toner particles having an external additive may be used as a developer. The developer may be a one-component developer substantially composed of only toner particles, or may be a two-component developer having toner particles and carrier particles.

The toner particles include, for example, toner mother particles containing a binder resin and a colorant, and an external additive attached to the surface of the toner mother particles. The toner mother particles may be appropriately configured based on known techniques according to the image to be formed in the image forming method.

The external additive is a particle exhibiting an effect of improving the characteristics of toner particles such as fluidity and charging characteristics, and may be appropriately selected from known ones. The external additive may be of one type or more, and examples thereof include inorganic fine particles, organic fine particles and lubricants.

Examples of the above-mentioned inorganic fine particles preferably include fine particles of silica, titania, alumina or strontium titanate. The surface of the inorganic fine particles may be hydrophobized when needed.

Examples of the silica fine particles include: R-805, R-976, R-974, R-972, R-812, and R-809 which are commercial products manufactured by Nippon Aerosil Co.; and TS-720, TS-530, TS-610, H-5, and MS-5 which are commercial products manufactured by Cabot Corporation.

Examples of the titania fine particles include: T-805 and T-604 which are commercial products manufactured by Nippon Aerosil Co., Ltd.; MT-100S, MT-100B, MT-500BS, MT-600, MT-600SS, and JA-1 which are commercial products manufactured by Tayca Corporation; TA-300SI, TA-500, TAF-130, TAF-510, and TAF-510T which are commercial products manufactured by Fuji titanium industry Co., Ltd.; and IT-S, IT-OA, IT-OB, and IT-OC which are commercial products manufactured by Idemitsu Kosan Co., Ltd.

Examples of the alumina fine particles include: RFY-C and C-604 which are commercial products manufactured by Nippon Aerosil Co., Ltd.; and TTO-55 which is a commercial product manufactured by Ishihara Sangyo Co., Ltd. Examples of the organic fine particles include organic fine particles having a number average primary particle diameter of about 10 to 2000 nm. Examples of the material of the organic fine particles preferably include homopolymers such as styrene and methyl methacrylate and copolymers thereof.

Examples of the above lubricants include particles of metal salts of higher fatty acids. Examples of such higher fatty acid metal salts include: zinc, aluminum, copper, magnesium and calcium salts of stearic acid; zinc, manganese, iron, copper, magnesium salts of oleic acid; zinc, copper, magnesium and calcium salts of palmitic acid; zinc and calcium salts of linoleic acid; and zinc and calcium salts of ricinoleic acid.

The content of the external additive in the toner particles is preferably in the range of 0.1 to 10.0 mass %. The toner particles may be formed by mixing the toner mother particles and the external additive using a known mixing device such as a Turbular mixer, a Henschel mixer, a Nauta mixer and a V-type mixer.

FIG. 1 is a diagram schematically illustrating an example of a configuration of an image forming apparatus of the present invention. The image forming apparatus is provided with the following constituting members as indicated in FIG. 1: a drum-shaped image carrier 10 rotatably disposed in the direction of arrow A; a charging device 11 for charging the surface of the image carrier 10;

an exposure device 12 for exposing the surface of the charged image carrier 10 to form an electrostatic latent image; a developing device 13 for forming an electrostatic latent image with a developer containing toner particles to form a toner image, a transfer device 14 for transferring the toner image formed on the image carrier 10 to a transfer material P, a separation device 15 for separating the transfer material P after transfer from the image carrier 10, a cleaning device 20 for removing toner particles remaining on the image carrier 10 after transfer; and a fixing device 16 for fixing the unfixed toner image on the transfer material P to the transfer material P. The charging device 11, the exposure device 12, the developing device 13, the transfer device 14, the separation device 15 and the cleaning device 20 are disposed on the outer peripheral side of the image carrier 10 in this order along the direction of arrow A.

The cleaning device 20 has a cleaning container 205 opened toward the image carrier 10, and a cleaning blade 201 supported by the opening of the cleaning container 205 and in contact with the surface of the image carrier 10. The cleaning blade 201 is supported at its proximal end by the support member at the opening so that its front end abuts on the surface of the image carrier 10. The direction of extension from the proximal end side of the cleaning blade 201 to the image carrier 10 is a direction opposite to the rotation direction of the image carrier 10 (the movement direction of the surface thereof), a so-called counter direction.

Figure 2:
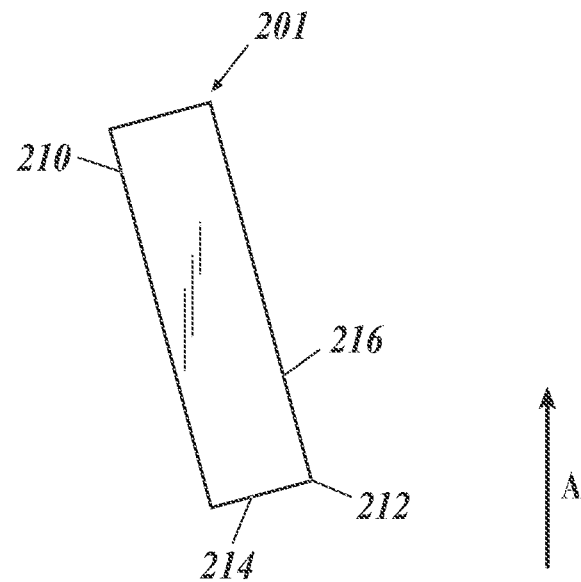
FIG. 2 is a drawing schematically illustrating a configuration of a cleaning blade of the present invention.

The cleaning blade 201 is used as an elastic plate member 210 as indicated in FIG. 2. The plate-like member 210 has an edge portion 212, a first portion 214 and a second portion 216.

Figure 3:
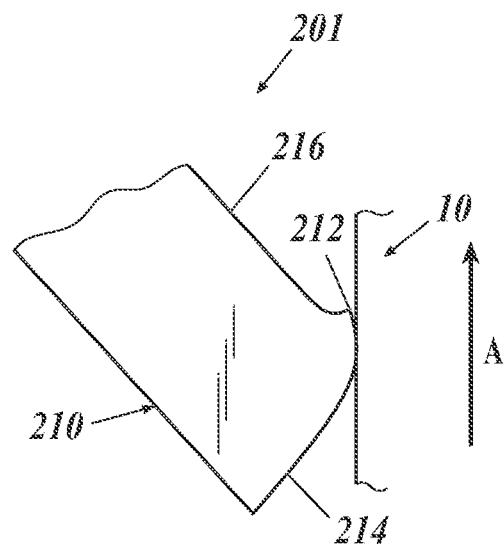
FIG. 3 is a drawing schematically illustrating a state of a cleaning blade in contact with a surface of an image carrier.

The cleaning blade 201 is disposed to press the surface of the image carrier 10 at the edge portion 212, as indicated in FIG. 3. The pressing force of the cleaning blade 201 on the image carrier 10 is preferably in the range of 14 to 35 N/m, and more preferably in the range of 17 to 30 N/m. When the pressing force is 14 N/m or more, toner particles are not easily slipped off due to the shortage of the pressing force. When the pressing force is 35 N/m or less, the stress applied to the contact portion of the member may be reduced, and cracks due to stress concentration may be suppressed, so that the effect of reducing wear may be sufficiently obtained.

The contact angle of the cleaning blade 201 with the surface of the image carrier 10 is preferably in the range of 10 to 30° as a rigid contact angle, and more preferably in the range of 12 to 27°. Usually, the edge portion 212 is drawn in the rotational direction (direction of an arrow A) to form a proper cleaning nip portion in the first portion 214. When the contact angle is 12° or more, since the cleaning blade 201 will not be in contact with the surface of the image carrier 10 in the second portion 216, it will not form a so-called "belly contact state", there is no slippage of toner particles. Also, when the contact angle is 27° or less, the amount of retraction of the cleaning member in the sliding direction does not increase, and the expansion and bending of the rubber member do not increase, so the effect of reducing wear is sufficiently reduced.

The rigid body contact angle is an angle formed by the extension direction of the cleaning blade 201 with the tangent of the image carrier 10 at the contact position (θ in FIG. 1), at a position where the cleaning card 201 abuts on the surface of the image carrier 10, when the cleaning blade 201 is regarded as a rigid body.

The image carrier 10 is charged by the charging device 11, and an electrostatic latent image is formed on the surface of the charged image carrier 10 by exposure of the surface by the exposure device 12. The electrostatic latent image is developed by the supply of the toner particles of the developing device 13 and becomes a toner image. The toner image formed on the image carrier 10 is transferred to the transfer material P by the transfer device 14. The transfer material P carrying a toner image is separated from the surface of the image carrier 10 by the application of a voltage from the separation device 15. The toner image on the transfer material P is fixed to the transfer material P by heat and pressure by the fixing device 16.

Although the embodiments of the present invention have been described and illustrated in detail, the disclosed embodiments are made for purpose of illustration and example only and not limitation. The scope of the present invention should be interpreted by terms of the appended claims.

EXAMPLES

Hereinafter, the present invention will be specifically described by way of examples, but the present invention is not limited thereto. In addition, although the term "part" or "%" is used in an Example, unless otherwise indicated, it represents "mass part" or "mass %".

Example 1

<<Preparation of Cleaning Blade>>
[Preparation of Cleaning Blade 1]
(Preparation of Raw Material Urethane Rubber 1)

A polyester polyol 1 was obtained by dehydration condensation of 731.2 g of 1,8-octanediol (00024, manufactured by Tokyo Chemical Industry Co., Ltd.) with 730.7 g of adipic acid (A0161, manufactured by Tokyo Chemical Industry Co., Ltd.). 1000 g of the polyester polyol 1 and 380 g of 4,4'-diphenylmethane diisocyanate ("Millionate MT" manufactured by Nippon Polyurethane Industry Co., Ltd.) were reacted at 70° C. for 3 hours under a nitrogen atmosphere to obtain a liquid prepolymer. To this liquid prepolymer were added 52 g of 1,4-butanediol (B0680 manufactured by Tokyo Chemical Industry Co., Ltd.) as a chain extender and 35 g of 1,1,1-trimethylolpropane (B0680 manufactured by Tokyo Chemical Industry Co., Ltd.) as a crosslinking agent were added and mixed to the obtained liquid prepolymer at a temperature of 100 to 110° C. Thereafter, the liquid mixture was poured into a centrifugal molding machine. The mixture was rotational-molded at 150° C. for one hour with about 600 r.p.m. to obtain a plate-like polyurethane molded product. This was further aged at room temperature for 1 week, and then cut into a size of 2 mm×13 mm×350 mm to obtain a urethane rubber 1 as a raw material.

(Step of Fluorinating Urethane Rubber)

The above-mentioned urethane rubber 1 was placed in a treatment container, and the treatment container was depressurized to 100 Pa or less. Next, the atmosphere was replaced with a nitrogen gas as an inert gas, and then a fluorine gas was introduced into the vessel. The reaction conditions was set as follows. The temperature was 25 to 30° C., the treatment time was 6 hours, and the fluorine gas concentration was 43% (fluorine gas pressure 40 kPa, nitrogen gas pressure 53 kPa). Thus, a cleaning blade 1 having fluorine atoms up to 10 μm from the surface was produced.

[Preparation of Cleaning Blades 2 and 3]

In the preparation of the cleaning blade 1, only the processing time of the step of fluorinating the urethane rubber was adjusted. Similarly to the preparation of the cleaning blade 1, a cleaning blade 2 having fluorine atoms from the surface up to 20 μm in the depth, and a cleaning blade 3 having fluorine atoms from the surface up to 25 μm in the depth were produced.

[Preparation of Cleaning Blade 4]

After producing the raw material urethane rubber 1, the surface of the urethane rubber 1 was fluorinated as follows.

(Step of Fluorinating Urethane Rubber)

The surface of the urethane rubber 1 was fluorinated by irradiating the surface of the urethane rubber 1 with plasma generated under the following conditions using SF6 of 50 Pa in a vacuum atmosphere using the apparatus described in JP-A 6-9803. A cleaning blade 4 was manufactured by adjusting the processing time so as to have fluorine atoms within 10 μm from the surface.

(Fluorinating Conditions)
Applying DC voltage: 1 kV
Current between electrodes: 1 kV
Substrate temperature: Normal temperature

[Preparation of Cleaning Blade 5]
(Production of Urethane Rubber 2)

In preparation of the raw material urethane rubber 1, 365.6 g of 1,8-octanediol and 405.2 g of 2,2,3,3-tetrafluoro-1,4-butanediol (T2296 made by Tokyo Chemical Industry Co., Ltd.) were used in place of 731.2 g of 1,8-octanediol. A polyester polyol 2 was obtained. A urethane rubber 2 was prepared in the same manner as the urethane rubber 1 except that the polyester polyol 2 was used instead of the polyester polyol 1. A cleaning blade 5 having fluorine atoms uniformly in the entire area was prepared.

[Preparation of Cleaning Blade 6]

The surface of the urethane rubber 1 was roughened by sand blasting. A fluorinated carbon powder made from natural graphite and tetrafluoroethylene-perfluoroalkoxy-ethylene copolymer (also referred to as PFA resin) (MP-10-2 "trade name" manufactured by Mitsui Fluorochemicals Co., Ltd.) powder was prepared. The mixture was stirred at a concentration of 7 mass %, and this mixture was applied to the roughened surface by powder electrostatic coating with a thickness of 10 μm, and the coating was baked at 380° C. for 20 minutes. Further, the surface was finished to have a surface roughness (JIS-B-0601) of 1μ a to produce a cleaning blade 6.

[Preparation of Cleaning Blade 7]

The urethane rubber 1 having no fluorine atom was used as a cleaning blade 7 as it was.

[Preparation of Cleaning Blade 8]

As a rubber member, a commercially available fluororubber molded product (Model No. RBFM2-10, manufactured by Misumi Inc.) was made into the same size as the urethane rubber 1 and used as a cleaning blade 8.

($^{19}$F-NMR Measurement)

Each of the cleaning blades 1 to 8 prepared above was examined for the presence or absence of a fluorine atom directly connected to the cyclic structure portion. The presence of a fluorine atom directly bonded to the cyclic structure portion was confirmed from the peak position by fluorine 19 nuclear magnetic resonance ($^{19}$F NMR). The fluorine-19 nuclear magnetic resonance method was performed under the following conditions.

Equipment used: JNM-AL300 (made by JEOL Ltd.)
  Condition: 282.7 MHz
  Solvent: Deuterated acetone
  Standard: $CFCl_3$
  Internal standard: Bis(trifluoromethyl)benzene (Measurement of Fluorine Atom Presence Region)

The area where the fluorine atom was present was measured as follows. Each sample was embedded in a resin, and a cross-sectional line analysis was performed with the cross-section exposed by using the above-mentioned EPMA (electron beam micro analyzer). The width of the peak of the detected intensity peak value was taken as the depth of the fluorine atom present from the surface. The threshold value of fluorine intensity was measured at 50 using JXA-8900 manufactured by JEOL. In the case of fluorine gas treatment was performed in the step of fluorination, fluorine atoms were detected over the depth of fluorine atoms from the surface shown in the table, and no fluorine atoms were detected other than that.

<<Evaluation>>

Each of the cleaning blades 1 to 8 prepared above was adhered to a sheet metal. As the sheet metal, the same sheet metal as used in the cleaning blade mounted on the drum unit of Bizhub Pro C1100 was used. The drum unit of the image forming apparatus "Bizhub Pro C1100" (made by Konica Minolta Co., Ltd., "bizhub" is a registered trademark of the company) was removed, and the cleaning blade integrated part mounted as a standard was replaced with the evaluation blade of each example. The drum unit was mounted on the image forming apparatus. The contact load of the cleaning blade was set to 26 N/m, and the rigid contact angle was set to 20°.

An image chart with a printing rate of 3% was continuously printed on 100000 A3 duplex sheets. More specifically, the image chart used has one 12.6 mm wide band in the direction perpendicular to the transport direction. Temperature and humidity conditions during printing were low temperature and low humidity conditions (temperature 10° C., humidity 20% RH).

[Cleaning Property]

After the printing, the drum unit of the image forming apparatus was taken out, and the surface of the photoreceptor and the surface of the printed matter were visually observed. It was confirmed that toner was present in the form of streaks on the surface of the photoreceptor or in the non-image area of the printed matter, and the presence or absence of toner slippage was observed. The case where the toner slippage was not confirmed was judged as passing the examination, and the case where it was confirmed was judged as failing the examination. In Table I, each passing the examination was marked as ○, and failing the examination was marked as ×.

[Wear Width]

Figure 4:
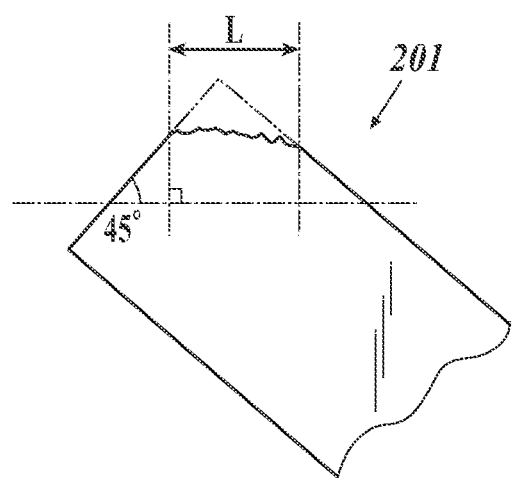
FIG. 4 is a drawing schematically illustrating wear of a cleaning blade.

The wear width of the cleaning blade after the evaluation of the cleaning property was measured by laser microscope observation. FIG. 4 is a drawing schematically illustrating the wear of the cleaning blade. As indicated in FIG. 4, in a cross section transverse to the longitudinal direction of the cleaning blade 201, a line intersecting at 45° with the surface of the blade tip was taken as a reference line, and the blade tip in a direction parallel to the reference line was observed. The distance L between the boundary of the surface of the blade and the chipped portion due to blade wear was taken as the wear width. In this evaluation, the case in which the wear width of 15 μm or less is judged as passing the examination The above evaluation results are listed in Table I. The following abbreviations were used in the table. Moreover, the compound in parenthesis in the column of polyol in the table indicates the material used for preparation of polyester polyols 1 and 2.

DPMDI: 4,4'-Diphenylmethane diisocyanate
  OD: 1,8-Octanediol
  BDTF: 2,2,3,3-Tetrafluoro-1,4-butanediol
  ADA: Adipic acid

TABLE I

| | Raw material rubber | | | | | | |
| --- | --- | --- | --- | --- | --- | --- | --- |
| | Isocyanate | | Polyol | | | | |
| Cleaning blade No. | Kind | Used amount (mass parts) | Kind | Used amount (mass parts) | Surface treatment | | |
| | | | | | Content | Method | Material |
| 1 | DPMDI | 380 | Polyester polyol 1 (OD, ADA) | 1000 | Fluorine gas treatment | Direct fluorination | $F_2$ gas |
| 2 | DPMDI | 380 | Polyester polyol 1 (OD, ADA) | 1000 | Fluorine gas treatment | Direct fluorination | $F_2$ gas |
| 3 | DPMDI | 380 | Polyester polyol 1 (OD, ADA) | 1000 | Fluorine gas treatment | Direct fluorination | $F_2$ gas |

TABLE I-continued

| | | | | | | | |
|---|---|---|---|---|---|---|---|
| 4 | DPMDI | 380 | Polyester polyol 1 (OD, ADA) | 1000 | Fluorine gas treatment | Plasma fluorination | $SF_6$ gas |
| 5 | DPMDI | 380 | Polyester polyol 2 (OD, BDTF, ADA) | 1000 | Absent | — | — |
| 6 | DPMDI | 380 | Polyester polyol 1 (OD, ADA) | 1000 | Powder application baking | | PFA resin |
| 7 | DPMDI | 380 | Polyester polyol 1 (OD, ADA) | 1000 | Absent | — | — |
| 8 | | | Fluororubber | | Absent | — | — |

| Cleaning blade No. | $^{19}$F-NMR peak Derived from Alkyl chain | $^{19}$F-NMR peak Derived from Benzene ring | Presence of Fluorine atom, Depth (μm) | Result Wear width (μm) | Result Cleaning property | Remarks |
|---|---|---|---|---|---|---|
| 1 | Present | Present | 10 | 9 | ○ | Present invention |
| 2 | Present | Present | 20 | 11 | ○ | Present invention |
| 3 | Present | Present | 25 | 14 | ○ | Present invention |
| 4 | Present | Present | 10 | 13 | ○ | Present invention |
| 5 | Present | Absent | Whole area | 19 | X | Comparative example |
| 6 | Present | Absent | 10 | 23 | X | Comparative example |
| 7 | Absent | Absent | — | 25 | X | Comparative example |
| 8 | Present | Absent | Whole area | 27 | X | Comparative example |

From Table I, it was proved that the cleaning blade which is a cleaning member of the present invention is excellent in the cleaning property, has a narrow wear width, and is excellent in the wear resistance.

What is claimed is:

1. A cleaning member comprising a urethane rubber, wherein the urethane rubber has a cyclic structure portion in which a fluorine atom is directly bonded to the cyclic structure portion.

2. The cleaning member described in claim 1, wherein the fluorine atom is present at least on a surface of the cleaning member.

3. The cleaning member described in claim 1, wherein the fluorine atom is present in a region within 20 μm in depth from a surface of the cleaning member.

4. The cleaning member described in claim 1 used for an ink jet printing or an electrophotographic printing.

5. The cleaning member described in claim 1 having a form of a cleaning blade.

6. A method of producing the cleaning member described in claim 1, comprising the step of:
fluorinating the urethane rubber by reacting the urethane rubber with a fluorine gas or a fluorine compound gas.

7. The method of producing the cleaning member described in claim 6, wherein the urethane rubber is reacted with a fluorine gas in the step of fluorinating the urethane rubber.

8. The method of producing the cleaning member described in claim 6, wherein the method further contains the step of:
molding the urethane rubber.

9. An image forming apparatus equipped with the cleaning member described in claim 1.

* * * * *